United States Patent

[11] 3,556,227

[72] Inventor Alton O. Homdrom
      Ambrose, N. Dak.
[21] Appl. No. 805,708
[22] Filed Mar. 10, 1969
[45] Patented Jan. 19, 1971

[54] SOIL CONDITIONING DEVICE
     9 Claims, 6 Drawing Figs.
[52] U.S. Cl. ....................................... 172/193,
     172/657, 172/701, 172/720, 172/730
[51] Int. Cl. ....................................... A01b 49/02
[50] Field of Search ............................ 172/193,
     169, 194, 195, 730, 142, 720—724, 642, 701, 728,
     140; 111/84, 85

[56] References Cited
UNITED STATES PATENTS

| | | | |
|---|---|---|---|
| 490,130 | 1/1893 | Whipple | 172/195 |
| 635,388 | 10/1899 | Pool | 172/194X |
| 1,172,946 | 2/1916 | Cooksey | 172/193 |
| 2,178,469 | 10/1939 | Burke | 172/193 |
| 2,604,025 | 7/1952 | Rauen | 172/720X |
| 2,690,113 | 9/1954 | Altgelt et al. | 172/720 |
| 2,755,751 | 7/1956 | Beilke | 111/85X |
| 2,894,590 | 7/1956 | Johnson | 172/194 |

FOREIGN PATENTS

| 467,987 | 11/1928 | Germany | 172/193 |
|---|---|---|---|

Primary Examiner—Robert E. Pulfrey
Assistant Examiner—Alan E. Kopecki
Attorney—Zarley, McKee and Thomte ABSTRACT: A soil conditioning device for use with shank-type field cultivators having at least front and rear rows of shank members with cultivator sweeps secured to the lower ends thereof. The device is attached to each of the shank members in the front row by means of the cultivator sweep attachment bolts extending through the sweep and through a bracket which is positioned at the rearward side of the shank member. An elongated rod is pivotally secured to the bracket and extends rearwardly therefrom between a pair of adjacent sweeps in the rear row. A V-shaped wing means is mounted on the rearward end of the rod and is positioned rearwardly of the adjacent sweeps so that the said sweeps will throw soil upon the wing means as the cultivator is moved through the field. The wing means modifies the ridge pattern that would otherwise be left by the cultivator.

PATENTED JAN 19 1971
3,556,227
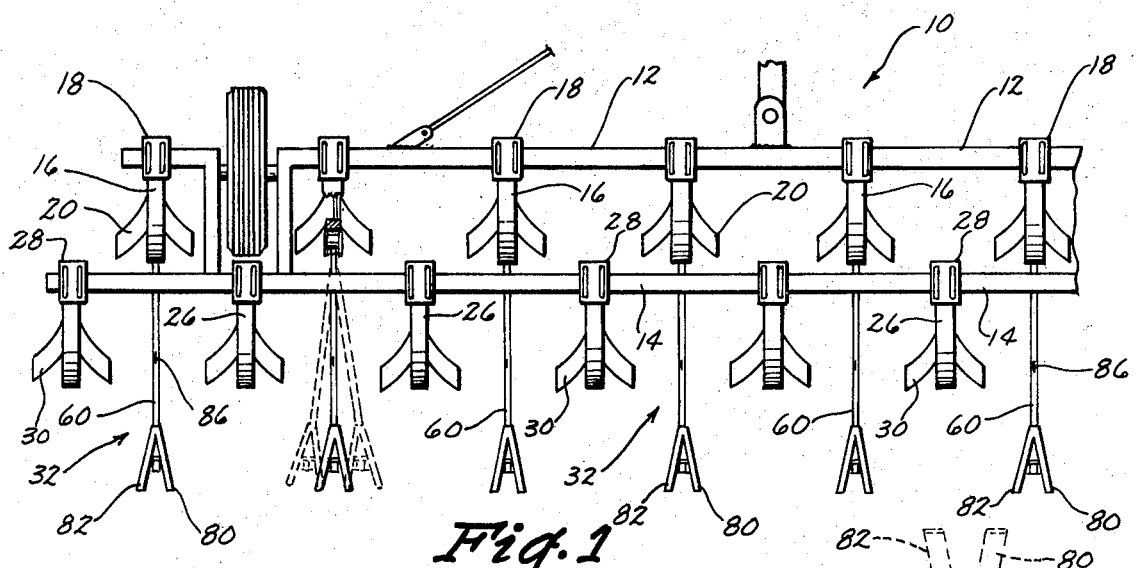
Fig. 1
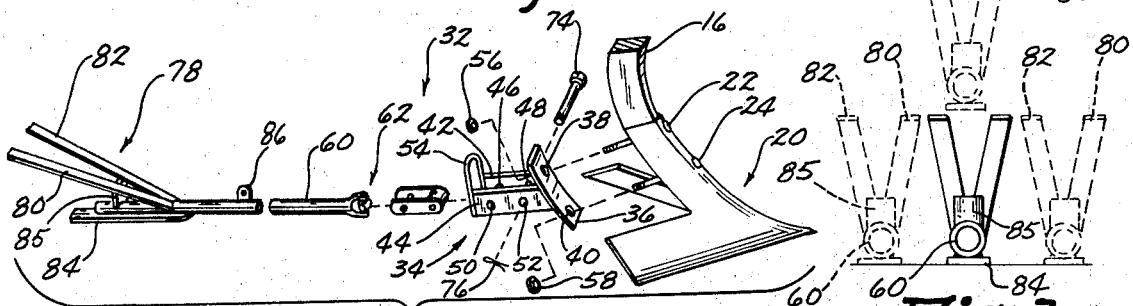
Fig. 2
Fig. 3
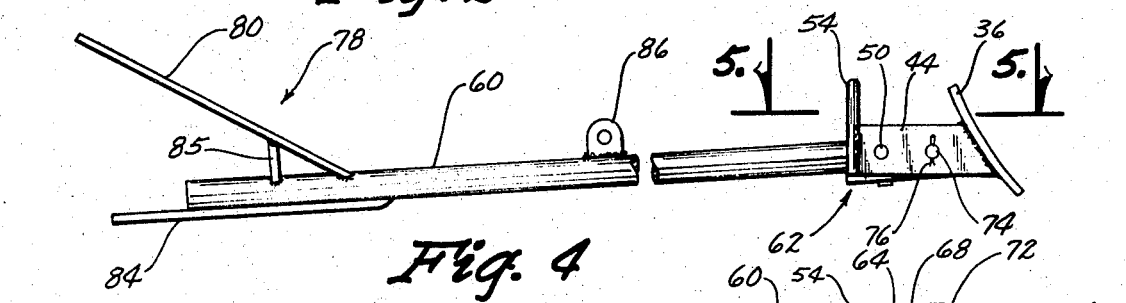
Fig. 4
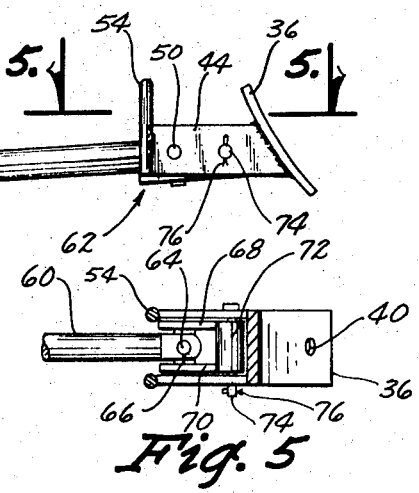
Fig. 5
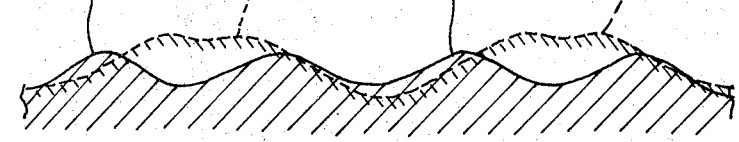
Fig. 6
INVENTOR
ALTON O. HOMDROM
BY
Zarley, McKee & Thomte
ATTORNEYS

SOIL CONDITIONING DEVICE

Heavy duty field cultivators of the shank type are usually equipped with rather large sweeps arranged in two or three spaced-apart and staggered rows. These cultivators leave an extremely deep ridge pattern which makes it quite uncomfortable to the tractor operator during subsequent field operations. It is often necessary to attempt to level the ridge pattern somewhat by means of a drag harrow or the like. The use of a drag harrow or the like does aid in levelling the ridge pattern but also flattens the trash and soil ridges to such an extent that necessary soil protection is sacrificed. The deep ridge pattern referred to above also makes it more difficult to prepare a proper seed bed.

Therefore, it is a principal object of this invention to provide a soil conditioning device for field cultivators which modifies the ridge pattern left thereby.

A further object of this invention is to provide a soil conditioning device for use with field-type cultivators which reduces the discomfort to the tractor operator during subsequent field operations.

A further object of this invention is to provide a soil conditioning device for a field cultivator which aids in the preparation of a proper seed bed.

A further object of this invention is to provide a soil conditioning device for field cultivators wherein the trash and soil ridges are not flattened.

A further object of this invention is to provide a soil conditioning device for field cultivators which provides a fine ridge pattern with erosion protection.

A further object of this invention is to provide a soil conditioning device for field cultivators which is adaptable for use with a variety of different types of cultivators.

A further object of this invention is to provide a soil conditioning device for field cultivators which will not become clogged with trash.

A further object of this invention is to provide a soil conditioning device for field cultivators which is held in place by the bolts holding the sweep on the cultivator shank.

A further object of this invention is to provide a soil conditioning device for field cultivators which includes a universal joint means to permit the device to move vertically and horizontally with respect to the cultivator.

A further object of this invention is to provide a soil conditioning device for a field cultivator which does not add substantially to the draft of the implement.

A further object of this invention is to provide a soil conditioning device for field cultivators which is easily and quickly secured to the cultivator.

A still further object of this invention is to provide a soil conditioning device for a field cultivator which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a fragmentary top view of one type of field cultivator to which the soil conditioning devices of this invention may be secured;

FIG. 2 is a fragmentary exploded perspective view of the device of this invention together with the shank and sweep to which the device is attached;

FIG. 3 is a rear view of the device illustrating the possible horizontal and vertical movement thereof;

FIG. 4 is a fragmentary side elevational view of the device;

FIG. 5 is a sectional view as seen along lines 5–5 of FIG. 4; and

FIG. 6 is a sectional view of the soil as it would appear after the cultivator of FIG. 1 has passed therethrough, the broken lines indicating the ridge pattern which would have been ordinarily left by a cultivator without the soil conditioning devices attached thereto.

The numeral 10 generally refers to a conventional field cultivator which is partially illustrated in FIG. 1 and can be seen to include a front frame member 12 and a rear frame member 14. It should be noted that the cultivator 10 is of conventional construction and could have three frame members rather than the two frame members as illustrated in FIG. 1. A plurality of spaced-apart shanks 16 are secured to the frame member 12 in conventional fashion by mounting brackets 18. Shanks 16 have a conventional cultivator sweep 20 secured to the lower end thereof by attachment bolts 22 and 24 extending therethrough. A plurality of spaced-apart shanks 26 are secured to the frame member 14 in conventional fashion by the mounting brackets 28 and have a cultivator sweep 30 mounted on the lower end thereof by suitable attachment bolts. It can be seen in FIG. 1 that the shanks 16 and 26 are staggered with respect to each other in the manner illustrated therein.

The sol conditioning device of this invention is generally referred to by the reference numeral 32 and includes a mounting bracket 34 which is secured to each of the shanks 16 as illustrated in FIG. 2. Bracket 34 includes an arcuate front plate 36 having a pair of openings 38 and 40 formed therein adapted to receive the attachment bolts 22 and 24 extending therethrough respectively. A pair of spaced-apart supports 42 and 44 are secured to plate 36 by welding or the like and extend horizontally therefrom. Support 42 is provided with a pair of openings 46 and 48 extending therethrough while support 44 is provided with a pair of openings 50 and 52 extending therethrough. An inverted U-shaped yoke 54 is secured to the rearward ends of supports 42 and 44 and extends therebetween as best illustrated in FIGS. 2, 4 and 5. The bracket 34 is maintained on the shank 16 by means of the nuts 56 and 58 being threadably received on the attachment bolts 22 and 24 rearwardly of the plate 36. Nuts 56 and 58 may be easily tightened by means of an impact wrench or the like.

The numeral 60 refers generally to an elongated member such as a rod or the like having a universal joint means 62 secured to the forward end thereof. Universal joint means 62 is of conventional construction and has a vertically disposed axis 64 and a horizontally disposed axis 66. A pair of ears extend forwardly from the universal joint means 62 and have a hollow sleeve 72 secured to the forward ends thereof and extending therebetween adapted to receive a pin means 74 therein. Member 60 is detachably secured to the mounting bracket 34 by inserting the pin means 74 through opening 48 in support 42, sleeve 72 and through opening 52 in support 44. If desired, pin means 74 could be inserted through openings 46 and 50. Pin means 74 is maintained in the supports 42 and 44 by a cotter key 76. A wing means 78 is provided at the rearward end of the elongated member 60 and includes a pair of angularly disposed wing arms 80 and 82 which extend upwardly, rearwardly and outwardly with respect to the member 60 as illustrated in FIGS. 2, 3 and 4. A support plate 85 is secured to and extends between the wing arms 80, 82 and the member 60 to aid in maintaining the wing arms 80 and 82 in the attitude seen in FIG. 4. While the drawings illustrate the wing means 78 as being comprised of a pair of wing arms 80 and 82, it should be noted that wing means 78 could be of solid construction or of the open construction illustrated in the drawings. The configuration of the wing means 78 illustrated in the drawings is the desired or preferred configuration but the wing means can be altered somewhat with an attendant loss of efficiency being experienced. A wear pad 84 is secured to the lower rearward end of elongated member 60 and is provided to increase the life of the elongated member 60. When the wear pad 84 becomes worn, it is simply necessary to replace the worn pad 84 with a new one without replacing the entire elongated member 60. Member 60 is also provided with an upstanding ear 86 intermediate the length thereof which may be connected to a common lift means or to a single wire to raise the member 60 out of engagement with the soil during periods of transport or the like.

If the devices are to be attached to a cultivator 10 having only two rows of cultivator sweeps provided thereon, the front row of sweeps or shanks should be arranged so that the member 60 extends rearwardly from the shank 16 between the shanks 26 on the frame member 14 as illustrated in FIG. 1. If the device is to be used on cultivators having three rows of shanks, the shanks should be arranged so that the member 60 extending from a front shank 16 will extend between the shanks mounted on the intermediate and rear rows of shanks. In other words, the shanks on the cultivator should be arranged so that the cultivator sweeps thereon will throw soil onto the wing means 78 from both sides thereof. The devices are quickly and easily attached to the front row of shanks by means of the attachment bolts 22 and 24 and the devices operate underneath the soil thrown over them by the cultivator sweeps of the rear row. The universal joint means 62 permits the rearward end of the device to have the proper horizontal and vertical flexibility while still supporting the wing means 78 in an upright position. Additionally, the elongated member 60 may also pivot in a vertical plane about the pin means 74 to further provide sufficient flexibility to the apparatus.

FIG. 6 illustrates the ridge pattern which is left by a cultivator having the devices attached and it can be seen that a fine ridge pattern is provided. The ridge pattern which is provided by a cultivator having devices attached is referred to by the reference numeral 88 while the ridge pattern which would otherwise be left by the cultivator is referred to by the reference numeral 90 and is indicated by broken lines in FIG. 6. It can be seen in FIG. 6 that the ridge pattern 88 does not contain the extremely deep valley between the ridges but rather provides a uniform ridge pattern. The ridge pattern 88 makes it easier for the farmer to prepare a proper seed bed and also eliminates a great amount of the discomfort which is ordinarily experienced by the tractor operator during subsequent field operations. The soil conditioning devices of this invention result in a more nearly level tillage area without sacrificing necessary erosion protection. The soil conditioning device of this invention provides the necessary ridge pattern without eliminating or flattening the trash and soil ridges which would result if a drag harrow or other leveling device was used on the field. The fact that the device operates beneath the soil thrown thereon by adjacent cultivator sweeps eliminates any clogging or plugging problems being encountered with trash or the like. In those situations where the field is going to be cultivated more than once, it may be that the operator would desire to use the soil conditioning device of this invention only on the last tillage operation. Thus it can be seen that a unique soil conditioning device has been provided which modifies the ridge pattern which would ordinarily be left by a conventional field cultivator so as to provide a more desirable ridge pattern and which may be adapted for use with a variety of different cultivators. It is possible to provide the desired ridge pattern without passing a drag harrow thereover. The devices disclosed herein add very little additional draft to the cultivator inasmuch as very little resistance is created by the elongated member 60 or by the wing means 78 moving the soil laterally therefrom. Thus it can be seen that the device accomplishes at least all of its stated objectives.

Some changes may be made in the construction and arrangement of my soil conditioning device without departing from the real spirit and purpose of my invention, and it is my intention to cover by my claims, any modified forms of structure or use of mechanical equivalents which may be reasonably included within their scope.

I claim:

1. In combination with a cultivator device having at least first and second forwardly and rearwardly spaced frame members transversely disposed to the direction of travel, a plurality of spaced-apart and staggered shank members secured to and extending downwardly from said frame members, a cultivator sweep means secured to the lower end of each of said shank members, the improvement comprising:
 a bracket means detachably secured to the rearward end of at least some of the shank members on the said first frame member;
 an elongated member having rearward and forward ends and being connected at its forward end to said bracket means and extending rearwardly therefrom; and
 means at the rearward end of said elongated member positioned behind the rearmost sweep means and adapted to pass through the soil to form a modified ridge pattern from that formed by the said sweep means.

2. The combination of claim 1 wherein said elongated member is pivotally secured about a horizontal axis to said bracket means.

3. The combination of claim 1 wherein said elongated member has a universal joint means secured thereto adjacent its forward end, said universal joint means having a vertically disposed pivotal axis and a horizontally disposed pivotal axis to permit said means at the rearward end of said elongated member to move horizontally and vertically with respect to said bracket means.

4. The combination of claim 1 wherein said means on the rearward end of said elongated member is comprised of a V-shaped wing means extending upwardly, rearwardly and outwardly therefrom.

5. The combination of claim 4 wherein a wear pad is secured to said elongated member beneath the lower rearward end thereof.

6. The combination of claim 1 wherein said bracket means includes a first plate means complementary in shape to the rearward end of said shank member and being positioned adjacent thereto, said first plate means being secured to said shank member by bolt members extending through said sweep means, said shank member and said first plate means, first and second spaced-apart supports secured to said first plate means and extending rearwardly therefrom, said forward end of said elongated member being received between said first and second support and being secured thereto.

7. The combination of claim 6 wherein said elongated member has a horizontally disposed sleeve at its forward end and wherein a pin means removably extends through said first and second supports and said sleeve, said sleeve being pivotal about a horizontal axis with respect to said pin means.

8. The combination of claim 7 wherein a yoke means is secured to and extends between the rearward ends of said first and second supports, said yoke means being in the upward pivotal path of said elongated member.

9. The combination of claim 4 wherein said first frame member is disposed forwardly of said second frame member, said elongated members extending rearwardly between adjacent pairs of shank members on said second frame member, said wing means being positioned rearwardly of the sweep means on the second frame member whereby the sweep means of said adjacent pairs of shank members will cause soil to be thrown on said wing means.